US007995462B2

(12) United States Patent
Gao et al.

(10) Patent No.: US 7,995,462 B2
(45) Date of Patent: Aug. 9, 2011

(54) METHOD FOR SUPPORTING SCALABLE AND RELIABLE MULTICAST IN TDMA/TDD SYSTEMS USING FEEDBACK SUPPRESSION TECHNIQUES

(75) Inventors: Xia Gao, Cupertino, CA (US); Fujio Watanabe, San Jose, CA (US); Gang Wu, San Jose, CA (US); Ravi Kumar Jain, Palo Alto, CA (US); Toshiro Kawahara, Saratoga, CA (US)

(73) Assignee: NTT DoCoMo, Inc., Tokyo (JP)

( * ) Notice: Subject to any disclaimer, the term of this patent is extended or adjusted under 35 U.S.C. 154(b) by 860 days.

(21) Appl. No.: 11/871,858

(22) Filed: Oct. 12, 2007

(65) Prior Publication Data

US 2008/0031179 A1 Feb. 7, 2008

Related U.S. Application Data

(62) Division of application No. 10/552,672, filed as application No. PCT/US2004/034060 on Oct. 14, 2004, now Pat. No. 7,447,148.

(60) Provisional application No. 60/515,467, filed on Oct. 28, 2003.

(51) Int. Cl.
*G01R 31/08* (2006.01)
(52) U.S. Cl. ......... 370/216; 370/229; 370/241
(58) Field of Classification Search ........ 370/328, 370/216, 229, 241
See application file for complete search history.

(56) References Cited

U.S. PATENT DOCUMENTS

| | | | | |
|---|---|---|---|---|
| 5,727,002 A * | 3/1998 | Miller et al. | ............... | 714/748 |
| 6,226,769 B1 * | 5/2001 | Schuster et al. | ............ | 714/752 |
| 6,275,471 B1 | 8/2001 | Bushmitch et al. | | |
| 6,574,770 B1 | 6/2003 | Daudelin | | |
| 6,834,039 B1 | 12/2004 | Kelly et al. | | |
| 7,106,757 B2 | 9/2006 | Hong et al. | | |
| 7,149,192 B2 | 12/2006 | Kwak | | |
| 7,206,586 B2 | 4/2007 | Kim et al. | | |
| 2001/0055356 A1 | 12/2001 | Davies | | |
| 2003/0005387 A1 * | 1/2003 | Tsunoda | ............... | 714/785 |
| 2003/0067903 A1 * | 4/2003 | Jorgensen | ............... | 370/338 |
| 2004/0078624 A1 | 4/2004 | Maxemchuck et al. | | |

(Continued)

FOREIGN PATENT DOCUMENTS

EP 1 128 591 8/2001

(Continued)

OTHER PUBLICATIONS

Donahoo, M.J.; Ainapure, S.R., "Scalable Multicast Representative Member Selection," INFOCOM 2001. Twentieth Annual Joint Conference of the IEEE Computer and Communications Societies. Proceedings IEEE, vol. 1, pp. 259-268, 2001.

(Continued)

*Primary Examiner* — Kevin C Harper
*Assistant Examiner* — Sai-Ming Chan
(74) *Attorney, Agent, or Firm* — Haynes & Boone, LLP.

(57) ABSTRACT

A method supports scalable and reliable multicast in a wireless network with a large bandwidth-delay product. In this method, acknowledgement packets from different receivers experiencing the same number of data packets lost are assigned the same time slots. This method can be combined with other loss recovery techniques, such as forward error correction (FEC) recovery, proactive protection, feedback suppression and collision detection. Scalability is achieved as bandwidth usage relates only to the number of packets transmitted, rather than the number of receivers.

9 Claims, 10 Drawing Sheets

U.S. PATENT DOCUMENTS

2007/0147371 A1   6/2007   Radha et al.

FOREIGN PATENT DOCUMENTS

JP   2000-151680   5/2000

OTHER PUBLICATIONS

English Language Abstract for JP Application No. 2000-151680; Patent Abstract of Japan, 1 page.
Tang K. et al.: "Mac Reliable Broadcast Ad Hoc Networks" Milcom 2001. Proceedings. Communication for Network-Centric Operations: Creating the Information Force. McLean, VA, Oct. 28-30, 2001, IEEE Military Communications Conference, New York, NY: IEEE, US, vol. 1 of 2.
Chlamtac I. et al.: "An Adaptive Medium Access Control (MAC) Protocol for Reliable Broadcast in Wireless Networks" ICC 2000. 2000 IEEE International Conference on Communications. Conference Record. New Orleans, LA Jun. 18-22, 2000, IEEE International Conference on Communications, New York, NY: IEEE, US, vol. 3 of 3.
Rizzo L. et al.: "A Reliable Multicast Data Distribution Protocol Based on Software FEC Techniques" IEEE Workshop on High-Performance Communication Systems. Proceedings of Workshop on the Architecture and Implementation of High Performance Communications Subsystems, Jun. 23, 1997, pp. 115-124.
Schulte W.: "Schnell, Kabellos—Und Auch Mobil Die IEEE—Standards 802.16 UND 802.20 Fuer Funk-Metronetze" Net-Zeitschrift Fuer Kommunikationsmanagement, Huthig Verlag, Heilderberg, DE, vol. 58, No. 12, 2004, pp. 30-33.
Towsley, Don; Kurose, Jim; Pingali, Sridhar; "A Comparison of Sender-initiated and Receiver-Initiated Reliable Multicast Protocols" spinga@msmail.sapient.com; Sigmetrics 94, May 2005; pp. 1-21.
Floyd, Sally; Jacobson, Van; Liu, Ching-Gung; McCanne, Steven; Zhang, Lixia; "A Reliable Multicast Framework for Light-weight Sessions and Application Level Framing"; IEEE/ACM Transactions on Networking, Dec. 1997; Sigcomm 95, Aug. 1995; pp. 19.
Grossglauser, Matthias; "Optimal Deterministic Timeouts for Reliable Scalable Multicast" grossgla@research.att.com; Infocom 96, Mar. 1996; pp. 8.
DeLucia, Dante; Obraczka, Katia; "Multicast Feedback Suppression Using Representatives"; Infocom 97, Apr. 1997; pp. 8.
Kasera, Sneha K.; Kurose, Jim; Towsley, Don; "Scalable Reliable Multicast Using Multiple Multicast Groups"; IEEE Trans. on Networking, CMPCI Technical Report TR 96-73, Oct. 1996; pp. 1-24.
Lin, John C.; Paul, Sanjoy; "RMTP: A Reliable Multicast Transport Protocol"; IEEE Infocom 96, Mar. 1996; pp. 1414-1424.
Papadopoulos, Christos; Parulkar, Guru; "Implosion Control For Multipoint Applications"; Proc. of $10^{th}$ annual IEEE Workshop on Computer Communications, Sep. 1995; pp. 1-11.
Nonnenmacher, Jorg; Biersack, Ernst; Towsley, Don; "Parity-Based Loss Recovery for Reliable Multicast Transmission"; Trans. on Networking, Technical Report 97-17, Mar. 1997; pp. 1-21.
Rubenstein, Dan; Kurose, Jim; Towsley, Don; "A Study of Proactive Hybrid FEC/ARQ and Scalable Feedback Techniques for Reliable, Real-Time Multicast"; Computer Communications, Mar. 2001; pp. 1-25.
Deng, Robert; Lin, Michael L.; "A Type I Hybrid ARQ System With Adaptive Code Rates"; IEEE Trans. on Communications, vol. 43, No. 2/3/4, Feb./Mar./Apr. 1995; pp. 733-737.
Kuri, Joy; Kasera, Sneha Kumar; "Reliable Multicast in Multi-access Wireless LANs"; Wireless Networks, No. 7, 2001; pp. 8.
Holbrook, Hugh W.; Singhal, Sandeep K.; Cheriton, David R.; "Log-Based Receiver-Reliable Multicast for Distributed Interactive Simulation"; Sigcomm 95, Aug. 1995; pp. 14.
McAuley, Anthony J.; "Reliable Broadband Communication Using a Burst Erasure Correction Code"; ACM Sigcom 90, Sep. 1990; pp. 1-10.

* cited by examiner

METHOD FOR SUPPORTING SCALABLE AND RELIABLE MULTICAST IN TDMA/TDD SYSTEMS USING FEEDBACK SUPPRESSION TECHNIQUES

CROSS REFERENCE TO RELATED APPLICATIONS

The present invention is a division of U.S. patent application Ser. No. 10/552,672 filed on Oct. 6, 2005 now U.S. Pat. No. 7,447,148, which is a National Stage Entry of PCT/US2004/034060 filed on Oct. 14, 2004, which claims priority of U.S. provisional application 60/515,467 filed on Oct. 28, 2003, all of which are incorporated herein by reference.

BACKGROUND OF THE INVENTION

1. Field of the Invention

The present invention relates to computer networks. In particular, the present invention relates to providing a reliable multicast service without requiring the sender to check successful receipt of the multicast packet by each individual recipient.

2. Discussion of the Related Art

3GPP, 3GPP2 and WLAN systems provide multicasting services, i.e., each system is capable of distributing information from a source to multiple receivers in a multicast area using a single broadcast. Multicasting allows efficient use of scarce network resources (e.g., the air interface) when sending the same information to multiple users.

In applications such as multimedia streaming and location-based advertising, receivers in a multicast group can tolerate some packet losses. In such applications, to keep the system simple, unreliable multicast services without loss recovery ability may be used. To maintain acceptable performance, the application can use upper layer reliable mechanisms (e.g., application layer forward error coding) to decrease packet loss percentage. However, for an application that is "non-fault-tolerant" (e.g., software upgrade distribution, distributed computing or network management which require "non fault-tolerant" information), or an application which can only tolerate a very small percentage of the transmitted packets to be lost, a reliable multicast services is desired due to the fast recovery requirement.

IP and link layer protocols are the two main existing categories of reliable multicast. IP-layer multicast protocols focus on end-to-end multicast between heterogeneous senders and receivers interconnected through the Internet. Link layer multicast protocols focus on multicast support between adjacent senders and receivers interconnected by a common multi-access shared link. Until now, more research has been devoted to IP layer multicast protocols than link layer multicast protocols.

Current link layer multicast protocols are applicable only to local area networks that has a small bandwidth-delay product and which uses stop-and-wait automatic repeat request (ARQ) mechanism to recover packet loss (e.g., 802.11 type of WLAN). Such multicast protocols are not scalable for a wireless network with a large bandwidth-delay product. Thus, there is a need for a reliable multicast protocol for a wireless network with a large bandwidth-delay product.

A reliable multicast protocol must overcome the "feedback implosion problem" that arises as a result of the number of receivers. The feedback implosion problem is illustrated by FIG. 1. As shown in FIG. 1, if each multicast packet sent from a single source S1 requires an acknowledgement from each of recipients R1-R5, the number of acknowledgement (positive or negative) packets increases as the number of receivers. Thus, acknowledgement packets from a large number of multicast receivers can overwhelm the sender's processing capacity, and also cause congestion in the sender's neighboring routers and local networks.

Sender-initiated protocols are typically vulnerable to the feedback implosion problem, as these protocols require the sender to be responsible for reliable delivery. In such a protocol, the sender keeps tracks of the acknowledgement packets received from the receivers. Further aggravating the problem are the requirements that (1) all transmissions and retransmissions (i.e., recovery transmissions) are multicast to all receivers, and (2) the sender continues to track the changing set of active receivers and their reception states. In particular, because the IP multicast model requires a multicast data packet to be addressed to a multicast group—thereby imposing a level of indirection between the sender and the receivers—it may be expensive or impossible for the sender to track the reception state of each receiver.

To circumvent the problems inherent with sender-initiated protocols, most scalable and reliable multicast protocols are receiver-initiated protocols, which require each receiver to be responsible for reliable packet delivery to itself. In such a protocol, a receiver sends a negative feedback or negative acknowledgement packet (i.e., NACK packet) to the sender when a retransmission is required (e.g., when an error is detected, a packet of an expected sequence number is not received, or a timeout occurs), and the sender is not required to maintain an updated receiver list. As compared to a sender-initiated protocol, a receiver-initiated protocol is generally less sensitive to the number of receivers receiving the multicast and results in a substantially lesser number of feedback packets. Receiver-initiated protocols are thus more scalable than sender-initiated protocols. Nevertheless, receiver-initiated protocols are still vulnerable to a NACK-implosion at the sender, when transmission errors are widespread at any given time, thereby resulting in a large number of NACK packets at the same time. Such a condition may occur when a resource is shared in a multicast tree, so that correlated losses among different receivers can occur. For example, when a packet is lost on a link to a sub-tree, each receiver downstream from the link will experience a loss and will then respond with negative feedback at substantially the same time.

The NACK implosion problem may be overcome by "timer-based protocols", which assign different delays to the receivers. Under such a protocol, upon detecting a packet loss, rather than sending a NACK immediately, a receiver waits until its assigned delay expires before sending the NACK packet. Timer-based protocols thus stagger NACK packets from different receivers. Ideally, one of the receivers sends out a NACK packet early enough in time to allow the retransmission to occur before other receivers send their NACK packets. Alternatively, if the NACK packet is multicast to all receivers, other receivers may refrain from sending their own NACK packets in anticipation of the retransmission responsive to the first NACK packet. The performance of timer-based protocols thus depends on the algorithm that assigns timeout values to the different receivers.

To provide scalable reliable multicast services, "structure-based protocols" distribute the NACK (or ACK) processing tasks to multiple nodes, so that the sender's load can be decreased. These protocols organize multicast receivers into different logical network structures such as a tree. In such an organization, a downstream node sends its ACK or NACK packets upstream to an intermediate node between it and the sender. The downstream node also receives recovery packets from the intermediate node. When the intermediate node is unable to provide recovery, the NACK or ACK packet is passed further upstream to the sender node.

An important aspect of a reliable multicast protocol is error recovery. While most reliable multicast protocols use a pure ARQ scheme to recover a packet loss, a hybrid forward error correction (FEC) and ARQ scheme may substantially reduce feedback implosion and the expected delay of packet delivery without an increased bandwidth requirement. In the prior art, there are two kinds of hybrid FEC and ARQ schemes. In a first kind, repair bits are sent within a repair packet to correct bit errors or erasures, unless the number of repair bits is large. In that case, a retransmission scheme is used. In a second kind, the repair bits are transmitted separately from the data packets.

The protocols discussed above all operate in the IP layer. A link layer protocol extends reliable multicast in multi-access wireless LANs at the last hop of a wireless link, using both positive feedback (ACK) and negative feedback (NACK) packets. Under this protocol, a receiver in the multicast group is chosen as a "leader" or representative for the purpose of sending feedback to the sender (e.g., a base station). Whenever the leader successfully receives a packet, it returns an ACK packet. However, if this leader node detects an error in the received data packet, the leader node does not send an acknowledgement, thereby triggering an automatic retransmission from the sender. If another receiver, not the leader, detects an error in its received packet, this receiver sends out a negative acknowledgement (NACK) packet, which conflicts with the ACK packet sent from the leader. When such a condition occurs, the sender retransmits the packet.

IP layer multicast protocols typically include techniques for maintaining the multicast tree, estimating round-trip-time delay, managing group membership, and choosing error recovery methods. These protocols are designed for complex network topologies in which senders and receivers are interconnected with multi-hop links and have different link bandwidths, crossover traffic, and loss probabilities. For a simple topology involving one sender and multiple receivers connected by single shared wireless link, using such an IP layer multicast would be inefficient and overkill.

The article "Parity-based loss recovery for reliable multicast transmission," by J. Nonnenmacher, E. Biersack, and D. Towsley, *IEEE Tran. on Networking*, August 1998 describes a multicast scheme that (1) uses a stop-and-wait ARQ scheme to recover packet loss, (2) selects a single receiver as a leader of the multicast group, and (3) treats a collision of an ACK packet and a NACK packet as a negative acknowledgement. However, this stop-and-wait ARQ scheme is suitable only for a 802.11 type network having a small bandwidth-delay product. For a wireless network with a high bandwidth-delay product (e.g., a 802.20 network), a stop-and-wait ARQ scheme is considered wasteful of channel bandwidth. Also, the single leader approach represents a single point of potential failure and requires some overhead for leader maintenance. Further, the NACK and ACK collision approach can be used only in system where, at any given time, only one packet is outstanding and remains to be acknowledged. Under such a scheme, the sender determines an unsuccessful transmission by detecting collision, without having to examine the details of the acknowledgement received. However, if multiple packets can remain unacknowledged, the sender needs to examine each acknowledgement to find out which packets among the outstanding ones are lost. So the collision of ACK and NACK packets only signals the loss of some packet, unless further examination is carried out.

SUMMARY OF THE INVENTION

The present invention provides a scalable and reliable multicast method in a wireless network with high bandwidth-delay product, using link layer error detection and recovery techniques. The method is applicable to a method in which a sender at a base station and the receivers within the range of the base station are interconnected by wireless links with a high bandwidth-delay product. One applicable media access control (MAC) layer protocol for communication using these wireless links is time division multiplex access/time division duplex (TDMA/TDD). According to one embodiment of the present invention, a method of the present invention may combine FEC recovery, proactive protection, feedback suppression, NACK collision, and data and feedback grouping.

To fully utilize bandwidth, the method of the present invention may transmit simultaneously a group of multicast packets from the base station to a number of receivers. To suppress the number of feedback packets from all receivers, negative acknowledgement (NACK), instead of affirmative acknowledgement (ACK), is used to feed back to the sender. According to one embodiment, as both the receipt of a NACK packet and the detection of a NACK packet collision are treated as incidents of a NACK packet, multiple receivers targeted by the multicast may be assigned to the same time slot.

In one embodiment, a FEC-based packet loss recovery technique uses the same FEC packets to recover heterogeneous packet losses of different receivers. Given a large number of receivers with heterogeneous loss patterns, such a method greatly decreases packet retransmissions. FEC packets allow a NACK collision to be treated as the receipt of a NACK packet, as there is no need for tracking sequence numbers. Accordingly, a method of the present invention is scalable.

To decrease the delay of packet transmission, one method of the present invention provides proactive protection at both sender and receiver sides. At the sender side, FEC packets are sent with data packets. At the receiver side, recovery packets are requested in advance of actual packet losses.

According to another embodiment of the present invention, to enhance scalability and reliability, group acknowledgement from different receivers is accomplished by assigning each feedback time slot to all receivers of a predetermined number of packet losses. Under such a scheme, the feedback bandwidth required depends only on the number of packets sent, rather than the number of receivers in the system. Scalability is therefore achieved. At the same time, reliability is achieved because each receiver obtains all necessary FEC recovery packets.

Thus, the present invention supports scalable and reliable multicast service at the MAC layer. A method according to the present invention is especially suitable for use in a wireless network with a high bandwidth-delay product, and thus are advantageous over the prior art IP-layer based methods, or other methods that are suitable only for wireless link with low bandwidth-delay product. Further, a method according to the present invention may recover multicast packet losses locally at the wireless hop. As packet corruption in the wireless link is a significant cause of packet loss, a local recovery scheme allows very speedy recovery, relative to end-to-end based packet recovery methods.

In addition, a method embodying the present invention in the wireless hop can be combined with an IP-layer based multicast technique that provides reliable multicast in the core network. The present invention can save substantial wireless bandwidth, as compared to conventional IP-layer based multicast techniques that use unicast connections between the base station and each wireless terminal. A method using multicast reduces the congestion that results from the unicast traffic in the wireless links.

A method of the present invention is scalable because the number of acknowledgement packets does not depend on the number of receivers. By multiplexing acknowledgement packets from different receivers to a small number of time slots, and by treating a NACK collision event as equivalent to receiving a NACK packet, a method of the present invention can use the same number of uplink data channel and downlink data channel time slots to realize a fully reliable multicast service. Such a method does not require specific sequence numbers to keep track of NACK packets, further enhancing the method's scalability to systems of greater complexity. Scalability also results from assigning all receivers experiencing the same number of packet loss to the same negative acknowledgement time slot.

A method of the present invention may use FEC parity packets to recover packet loss. In a system having a large number of receivers and a heterogeneous loss pattern, using FEC can substantially decrease the number of packet retransmission.

The present invention is better understood upon consideration of the detailed description below and the accompanying drawings.

DETAILED DESCRIPTION OF THE PREFERRED EMBODIMENTS

Figure 1:
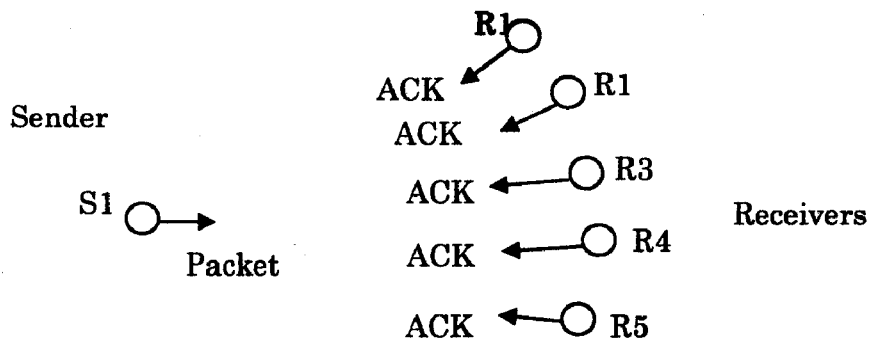
FIG. 1 illustrates the feedback implosion problem that plagues multicast protocols of the prior art.
Figure 2:
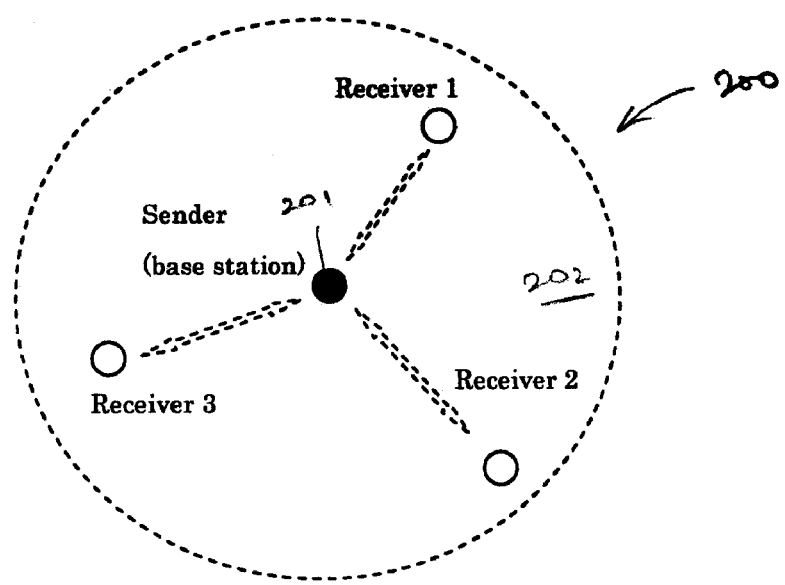
FIG. 2 shows system topology 200, in accordance with one embodiment of the present invention.

The present invention provides a method for supporting scalable and reliable multicast in a wireless network with a high bandwidth-delay product. FIG. 2 shows system topology 200, in accordance with one embodiment of the present invention. As shown in FIG. 2, base station 201 is a multicast sender in cell 202 served by base station 201. Mobile terminals 1-3, which are each communicating with base station 201 by wireless links, are receivers in a multicast group. In this embodiment, the downlink (i.e., from base station 201 to mobile terminals 1 to 3) and the corresponding uplink (i.e., from the mobile terminals to base station 201) are provided by multiplexing and duplexing the communication medium (e.g., a particular center frequency) in the media access (MAC) layer, using a time division multiple access/time duplex division (TDMA/TDD) scheme.

Figure 3:
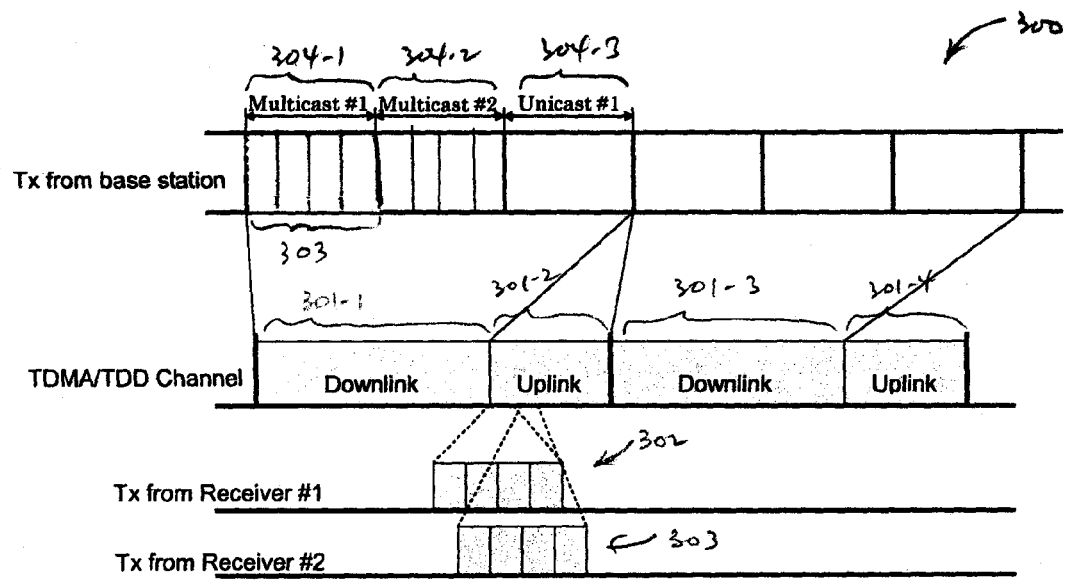
FIG. 3 illustrates a TDMA/TDD scheme 300, according to one embodiment of the present invention.

FIG. 3 illustrates a TDMA/TDD scheme 300, according to one embodiment of the present invention. As shown in FIG. 3, TDMA/TDD scheme 300 divides the available bandwidth into time periods 301-1, 301-2, . . . and allocates these time periods in an interleaved manner to transmissions by the downlink (e.g., 301-1, 301-3, . . . ) and transmissions by the uplink (e.g., 301-2, 301-4, . . . ). Portions of both the downlink transmissions and the uplink transmissions are dedicated to transmissions of data packets and thus are respectively referred to as the "downlink data channel" and the "uplink data channel". Each of the data channels are divided into time slots. In each time slot, only one user, or one group of users, is allowed to transmit. The bandwidths allocated to the data channels need not to be equal or fixed, and may, in fact, change from time to time. A dedicated control channel is used by the base station to broadcast assignments of the time slots to the uplink and downlink data channels, such that each receiver is informed of the time slots in which it may transmit data or acknowledgement packets to the base station, or receive data packets from the base station designating it as a recipient. For example, as shown in FIG. 3, receivers in multicast group 1 and in multicast group 2 are each assigned a group of four time slots, indicated by reference numerals 302 and 303, respectively, in transmission time period 301-2. All receivers in the same multicast group uses the same uplink channel time slots to transmit acknowledgement, according to this embodiment of the present invention. FIG. 3 also illustrates the base station transmitting messages 304-1, 304-2 and 304-3 during downlink transmission time period 301-1. Each message may be a multicast message (e.g., a multicast message to multicast group 1 or multicast group 2, as shown in scheme 300 of FIG. 3) or a unicast message, and may include multiple packets (e.g., message 304-1 includes the packets indicated by reference numerals 303). The downlink transmission period may be allocated for transmitting the messages in a multiplexed manner. Similarly, the uplink transmission time period may be multiplexed for transmitting acknowledgement or data packets from different receivers or groups. In the following description, under a method of the present invention, a transmission period in the downlink data channel (e.g., transmission time period or "frame" 301-1) followed by a transmission time period in the upline data channel (e.g., transmission time period 301-2) is referred to as a "round".

Figure 4:
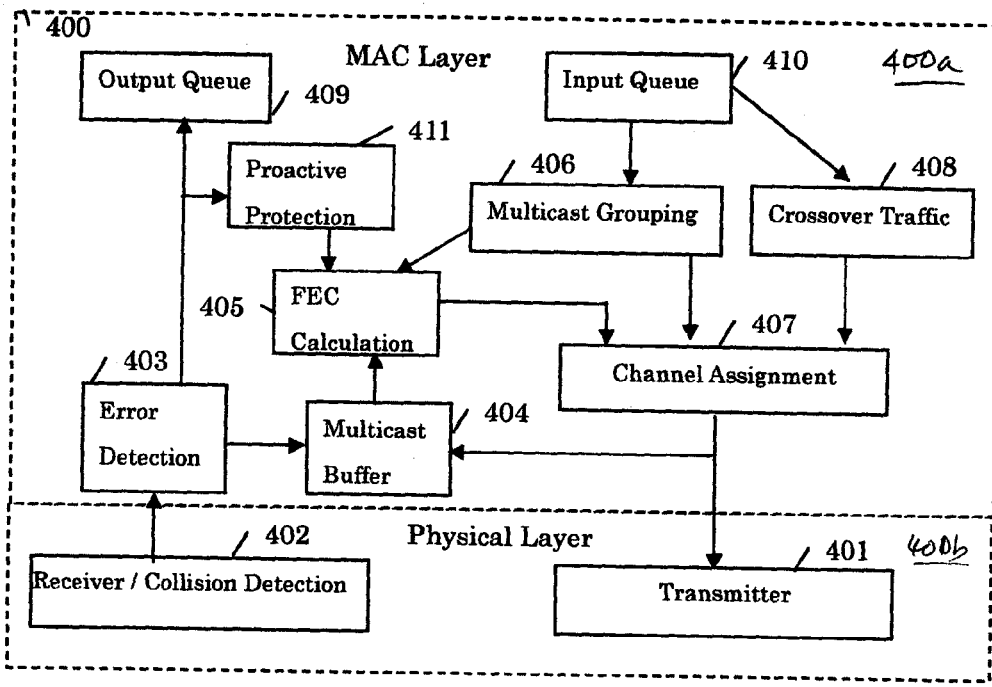
FIG. 4 is a block diagram showing functional blocks in the MAC layer and the physical layer (PHY) of base station 201.

FIG. 4 is a block diagram showing functional blocks 400 in MAC layer 400a and physical layer (PHY) 400b of base station 201. As shown in FIG. 4, functional blocks 400 include MAC layer 400a and PHY layer 400b of base station 201. PHY layer 400b includes transmitter 401, which receives MAC layer data units from channel assignment block 407 for transmission over a wireless link. PHY layer 400b also includes receiver and collision detection block 402, which receives packets from the wireless link and uploads the received packets to error detection block 403. Receiver and collision detection block 402 also measures the signal strength during the time slots used for multicast acknowledgement. In one embodiment, the TDMA/TDD scheme is NACK-based, and thus no ACK packet is transmitted for correct reception of data packets. In that embodiment, multiple receivers may use the same time slot for NACK packet transmission, and thus a collision detected in that time slot represents multiple receivers each sending out a NACK packet. Receiver and collision detection block 402 differentiates between a quiet channel (i.e., no transmission) and reception of a NACK packet (i.e., either as a successful receipt of a single NACK packet, or as detection of a packet collision condition) and reports the result to the error detection block 403 of MAC layer 400b.

Error detection block 403 provides verified data packets to output queue 409 which, in turns, passes the data packets up the protocol stack for processing by a higher level protocol (e.g., an IP layer protocol). (In this description, a verified data packet is a data packet that is received without an error detected at the MAC and PHY protocol layers). Error detection block 403 also receives from receiver and collision block 402 the NACK packets received and the signals indicating a collision condition for the multicast traffic, and identifies the data packets relating to the transmission failures. A number of error detection and correction schemes can be used with the present invention. For example, in one embodiment, the sender sends FEC parity packets to receivers which fail to correctly receive all the data packets of a multicast group, according to the multicast transmission scheme described below.

One suitable FEC algorithm is discussed in "Reliable broadband communications using a burst erasure correcting code," A. J. McAuley, published in SigComm90, September 1990. In that FEC algorithm, for a set of k data packets $\{p_1, p_2, \ldots, p_k\}$ to be encoded, Reed-Solomon erasure correcting code ("RSE code") provides a set of n-k $\{d_1, d_2, \ldots, d_{n-k}\}$ parity packets. The RSE decoder at a receiver can reconstruct the k data packets $\{p_1, p_2, \ldots, p_k\}$ using any k out of the n data and parity packets $\{p_1, p_2, \ldots, p_k, d_1, d_2, \ldots, d_{n-k}\}$. Because a RSE encoder that operates on a large symbol size is difficult to implement, MAC layer data packets are usually encoded using multiple m-bit encoders in parallel. In this algorithm, the total number of data and parity packets, n, is only limited by the constraint: $n \leq 2^m$. For example, using 16- or 32-bit symbols, up to $2^{16}$ or $2^{32}$ packets can be corrected. In practice, the total number of packets, n, and the number of FEC parity packets, n-k, can be selected to have any value to accommodate the size of multicast group and the channel loss characteristics. The description below illustrates the present invention using an error detection and correction mechanism, such as the RSE correcting code described above.

Thus, based on the number of packets reported lost in a current round, error detection block 403 determines the number of additional FEC parity packets needed for transmission in the next round. Multicast Buffer 404 stores the multicast group packets of the previous and current rounds and the FEC parity packets that have already been transmitted. These packets are removed from multicast buffer 404 when error detection block 403 indicates that no additional FEC parity packets are needed to be transmitted to the receivers. FEC parity packets that are needed are computed in FEC calculation block 405, using the multicast group packets and the FEC parity packets already transmitted.

The FEC parity packets output from FEC calculation block 405 are multiplexed with other data packets from multicast grouping block 406, and crossover traffic block 408 in channel assignment block 407. Crossover traffic block 408 manages all data packets not involved in the multicast described herein.

Under the MAC protocol TDMA/TDD, different data streams are assigned different time slots by channel assignment block 407. The FEC parity packets from FEC calculation block 405 are assigned a higher priority than new packets received from multicast grouping block 406, so as to allow rapid packet loss recovery. Generally, FEC parity packets from FEC calculation block 405 are assigned to time slots before any new data packet from multicast grouping block 406 is assigned. Multicast grouping block 406 buffers multicast packets from input queue 410 because reliable multicast transmission often takes longer time than unicast packets. Multicast grouping block 406's prevents blocking of input queue 410 and allows FEC parity packets to be used in conjunction with multicast data packets.

In this embodiment, proactive protection estimation block 411 calculates the current packet loss ratio based on the measurement in error detection block 403. Using the current packet loss ratio, proactive protection estimation block 411 determines a proactive protection ratio, which is the ratio of proactive FEC parity packet packets relative to data packets. The proactive protection ratio is then used by FEC calculation block 405 to create FEC parity packets, which are then provided to channel assignment block 407 for proactive transmission. The use of proactive protection is optional.

Figure 5:
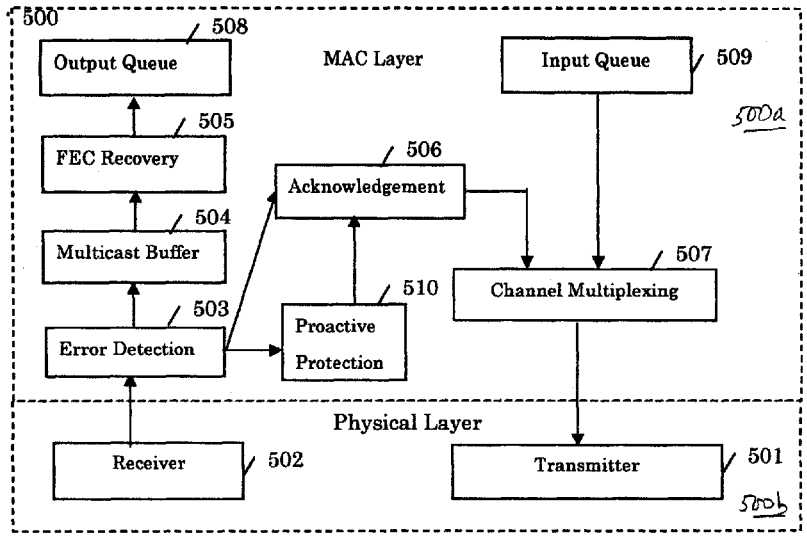
FIG. 5 is a block diagram showing functional blocks 500 in the MAC layer and the PHY layer of a multicast receiver, in accordance with one embodiment of the present invention.

FIG. 5 is a block diagram showing functional blocks 500 in the MAC and PHY layers 500a and 500b of a multicast receiver, in accordance with one embodiment of the present invention. As shown in FIG. 5, transmitter 501 in MAC layer 500b transmits both data packets and acknowledgement packets. As mentioned above, time slot assignments of both the uplink data channel and the downlink data channel are received from the base station (e.g., base station 201) through a dedicated control channel. Channel multiplexing block 507 multiplexes data packets for output to the wireless link through transmitter 501 during the assigned uplink time slots. At the assigned downlink time slots, receiver block 502 receives data packets from the wireless link, provides verified packets to error detection block 503, or reports to error detection block 503 any physical layer error in the receipt packets. Error detection block 503 stores verified multicast packets in multicast buffer 504, and reports the number of corrupt data packets received or detected in the current round to acknowledgement block 506. Acknowledgement block 506 provides a NACK packet to be transmitted in the uplink data channel at the appropriate acknowledgement time slot.

In this embodiment, proactive protection block 510 performs functions similar to those described above for proactive protection block 411 of base station 201. Proactive protection block 510 calculates the current loss percentage based on the error measurements from error detection block 503 and output a proactive protection ratio to acknowledgement block 506. Proactive protection block 506 then provides NACK packets based on the product of the number of actual loss packets in the current round and this proactive protection ratio. As in base station 201, proactive protection block 510 and its use are optional. Within the scope of the present invention, proactive protection may be used by the sender, the receiver, or both.

Multicast buffer 504 stores the verified data packets and the FEC parity data packets of the multicast group received until the total number of data packets and FEC parity packets is sufficient to reconstruct the multicast group. At that point, the data packets and the FEC parity packets, if any, are provided to FEC recovery block 505, which recovers the data packets. The recovered data packets are placed in output queue 508 to be passed up protocol stack for processing by a higher level protocol.

Figure 6:
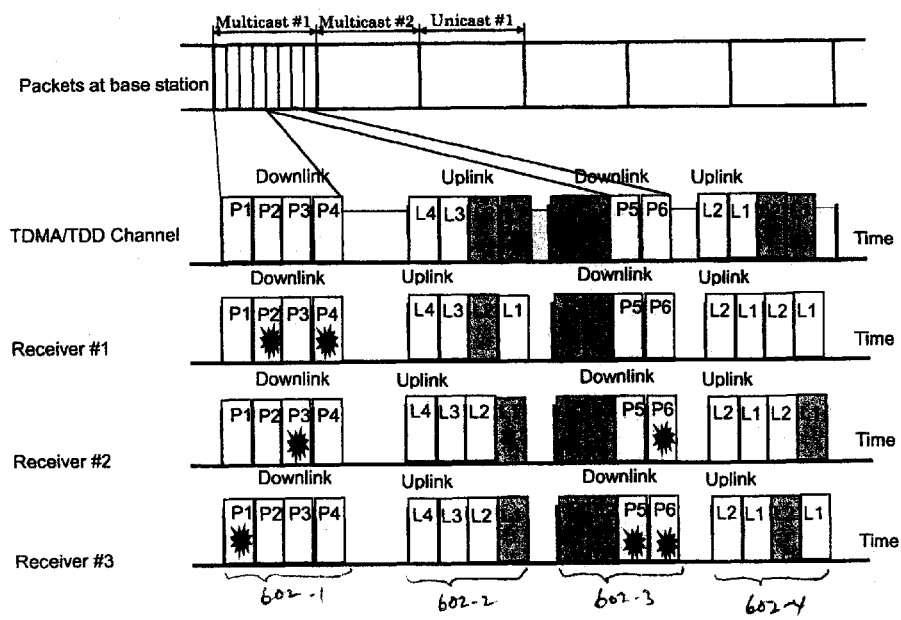
FIG. 6 illustrates scheduling of an uplink data channel and a downlink data channel, in accordance with one embodiment of the present invention.

FIG. 6 illustrates scheduling of the uplink data channel and the downlink data channel, in accordance with one embodiment of the present invention. As shown in FIG. 6, a multicast group of packets, including packets $P_1, P_2, \ldots, P_6$, are shown transmitted downlink (designating a multicast group address), and received by receivers 1, 2, and 3. Of course, both the number of packets and the number of receivers shown in FIG. 6 are provided for illustrative purpose only. In practice, a much greater number of receivers and a much greater number of data packets may be accommodated within the scope of invention. In round 1 (i.e., frames 602-1 and 602-2), four data packets ($P_1, P_2, P_3, P_4$) are transmitted in the downlink data channel. (In this description, four time slots are provided in each time frame merely for illustrative purpose; in practice, any number of time slots can be provided in each time frame) In FIG. 6, receiver 1 experiences errors in receiving data packets $P_2$ and $P_4$, receiver 2 experiences an error in receiving data packet $P_3$, and receiver 3 experiences an error in receiving data packet $P_1$. Thus, each receiver fails to receive at least one data packet which is different from the data packets failed to be received by the other receivers.

According to the embodiment of the present invention illustrated in FIG. 6, the number of assigned uplink acknowledgement time slots is equal to the number of assigned downlink data transmission time slots. Therefore, four time slots (indicated by reference numeral 602-2) are assigned for acknowledgement of the data packets transmitted in the current round. Under this arrangement, the first time slot in frame 602-2 is assigned to all receivers which fail to receive all of the four packets $P_1, P_2, P_3, P_4$, the second time slot of frame 602-2 is assigned to all receivers which fail to receive three of the four packets $P_1, P_2, P_3, P_4$, the third time slot of frame 602-2 is assigned to all receivers which fail to receive two of the four packets $P_1, P_2, P_3, P_4$, and the fourth time slot in frame 602-2 is assigned to all receivers which fail to receive one of the four packets $P_1, P_2, P_3, P_4$. Thus, receiver 1 sends a NACK packet during the third time slot (indicated by reference numeral $L_2$), and receivers 2 and 3 each send a NACK packet during the fourth time slot (indicated by reference numeral $L_1$). With two transmitters at the fourth time slot of frame 602-2, a collision is detected at the base station, which considers this collision condition to be the same as having received a NACK packet. As the largest number of packets lost experienced in any receiver during the current round is two, the base station computes and prepares for transmission two FEC parity packets $F_1$ and $F_2$ for recovery of packets $P_1$, $P_2, P_3$, and $P_4$; $F_1$ and $F_2$ are non-duplicate FEC parity packets not previously transmitted.

In round 2 (i.e., frames 602-3 and 602-4), FEC parity packets $F_1$ and $F_2$ are transmitted in the first and second time slots, respectively. Data packets $P_5$ and $P_6$ are transmitted in the third and fourth time slots. As FEC parity packets $F_1$ and $F_2$ relate to data packet sent in the previous round, data packets $P_5$ and $P_6$ of the current round are acknowledged separately from FEC parity packets $F_1$ and $F_2$. Thus, FEC parity packets $F_1$ and $F_2$ are acknowledged in the uplink data channel in the first and second time slots of frame 602-4, and data packets $P_5$ and $P_6$ are acknowledged in the third and fourth time slots of frame 602-4. Therefore, receiver 2, which fails to receive data packet $P_6$, transmits a NACK packet in the fourth time slot of frame 602-4; similarly, receiver 3, which fails to receive both data packet $P_6$ and $P_6$, transmits a NACK packet in the third time slot of frame 602-4.

As the number of acknowledgement time slots does not depend on the number of active multicast receivers, and depends only on the number of downlink data packets transmitted, a method of the present invention is scalable with respect to any increase in the number of multicast receivers. A method of the present invention also takes advantage of FEC techniques to ensure reliable data delivery. As compared to the prior art, which requires a time slot to be allocated to each receiver for each data packet transmitted, a method of the present invention is significantly more efficient in bandwidth. As shown in FIG. 6, using a method of the present invention, only two FEC parity packets, rather than four in the prior art, need to be transmitted to achieve error recovery.

FIG. 6 does not illustrate use of the proactive protection schemes discussed above. If proactive protection is used, the numbers of uplink and downlink slots may be different. For example, if the downlink proactive ratio is 1.5, then for a transmission of four data packets, 6 downlink time slots for the four data packets and two FEC parity packets may be used. In that example, the uplink data channel needs only four acknowledgement time slots, unless uplink proactive protection is used.

Figure 7:
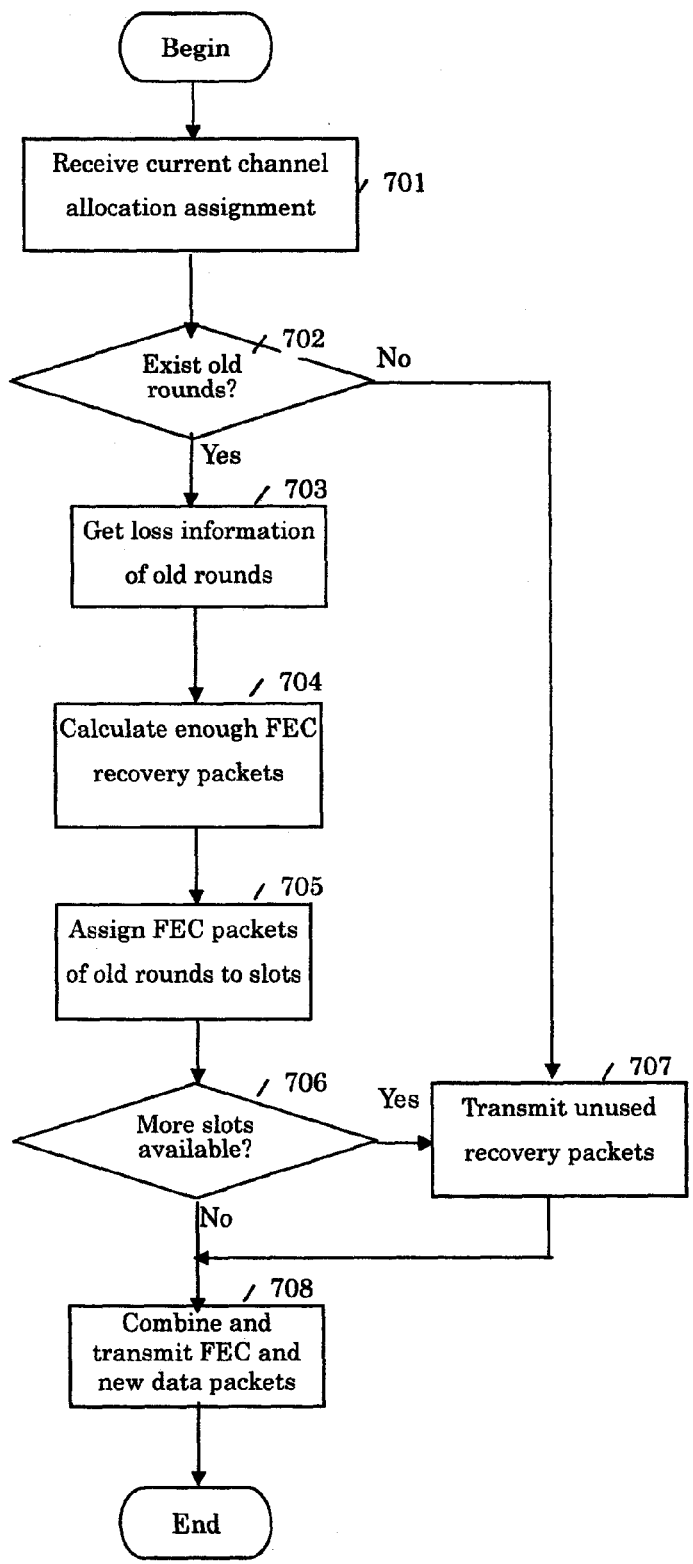
FIG. 7 is detailed flow chart 700, showing the functions that are carried out at a base station, in accordance with one embodiment the present invention.
Figure 8:
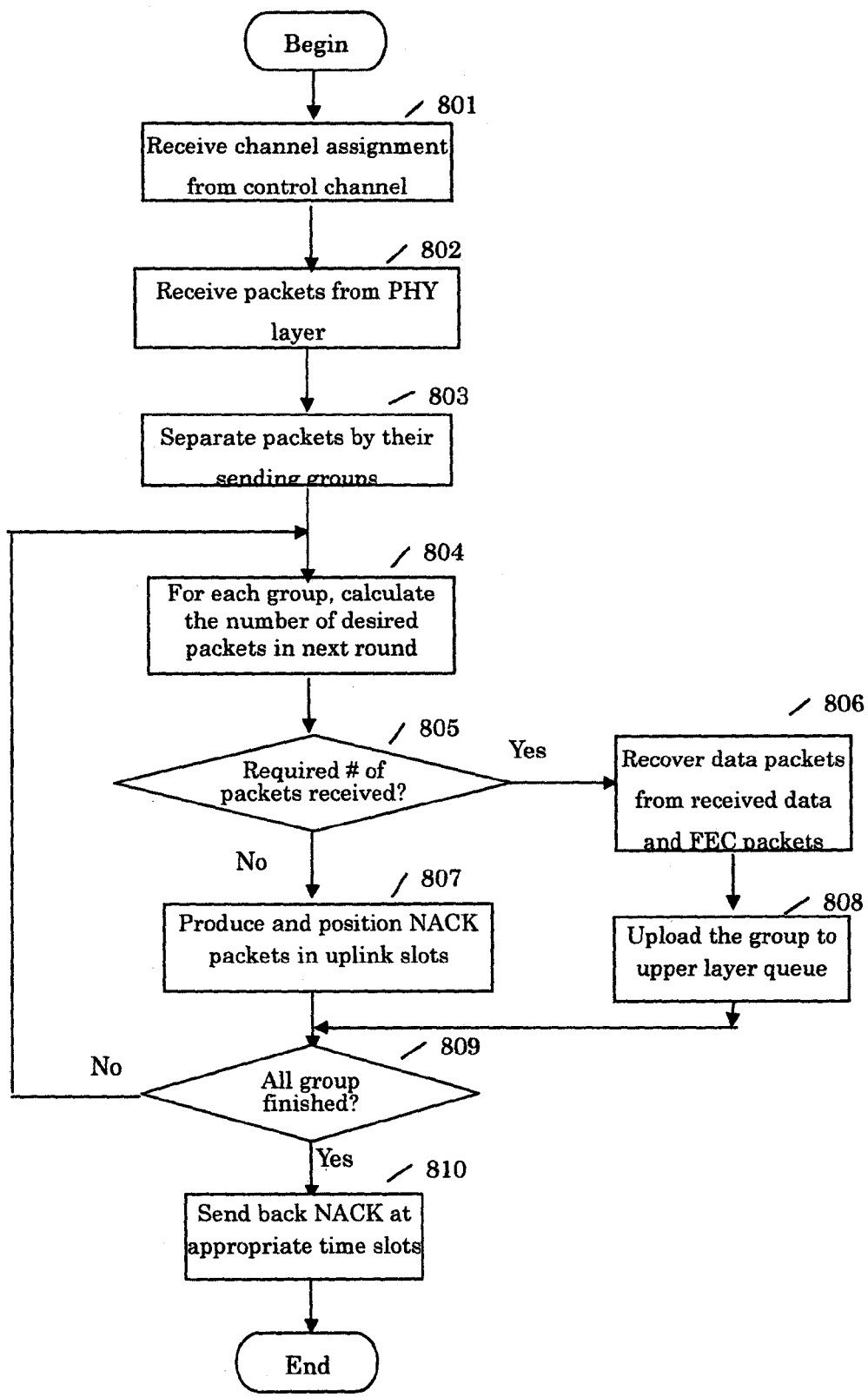
FIG. 8 is detailed flow chart 800, showing the functions that are carried out at a receiver, in accordance with one embodiment the present invention.

FIGS. 7 and 8 are detailed flow charts 700 and 800, showing the functions described above that are carried out at a base station and a receiver, respectively. In FIG. 7, at step 701, the base station's MAC layer broadcasts the time slot allocation assignment for multicast in the downlink data channel and the uplink data channel in a dedicated control channel. At step 702, the MAC layer of the base station examines whether previous multicast transmissions are complete. If any previous multicast transmission is incomplete, at step 703, the MAC layer of the base station collects the reception information of the incomplete transmissions. For each incomplete transmission, the MAC layer of the base station determines at step 704 the required FEC parity packets for error recovery, which are then assigned at step 705 for transmission in the available slots of the current frame in increasing multicast group number. If there are still empty slots remaining in the current frame after all FEC parity packets relating to previous incomplete transmissions are served, at step 707, the MAC layer of the base station fetches new data packets of a new multicast message from an upper layer protocol in the protocol stack. At step 708, the MAC layer of the base station prepares the FEC parity packets and new data packets for transmission at the appropriate time slots.

In FIG. 8, the MAC layer of a receiver receives the time slot assignments and group information of a multicast transmission in the downlink data channel and the uplink data channel from dedicated control channel (step 801). At step 802, the MAC layer of the receiver receives a multicast data packet of the current frame from its PHY layer. Using the group information, at step 803, the MAC layer of the receiver sorts the data packets into their respective multicast groups. Some or all data packets from any one of the groups may be lost in the communication channel. For each multicast group of data packets, the MAC layer of the receiver counts, at step 804, the verified data packets and non-duplicate FEC parity packets received in the current round, so as to determine any additional data packets or FEC parity packets that should be received in next round to allow the multicast group to be correctly decoded. At step 805, the MAC layer of the receiver determines whether the required number of packets for correct decoding the multicast group of packets have been received. If the required packets have been received, at step 806, the MAC layer of the receiver decodes and delivers the data packets up the protocol stack (step 808). However, if at step 805 the MAC layer of the receiver determines that additional data packets or FEC parity packets are required for any multicast group, the MAC layer prepares, at step 807, a corresponding NACK packet. After all the NACK packets are prepared, at step 810, the MAC layer of the receiver transmits the NACK packets in the appropriate time slots in the uplink data channel.

Figure 9:
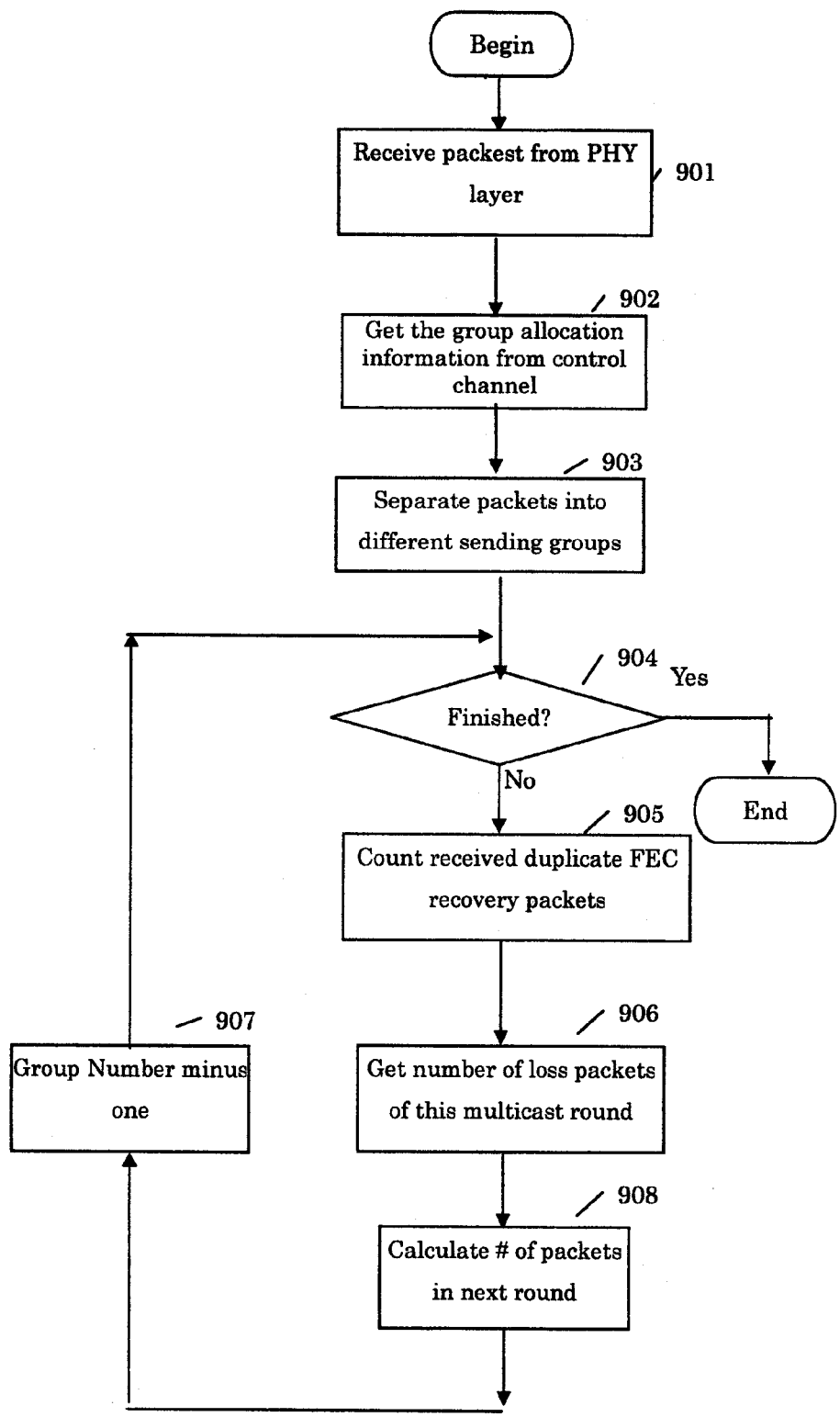
FIG. 9 is a flow chart illustrating the operations of error detection block 503 of FIG. 5.

FIG. 9 is a flow chart illustrating the operations of error detection block 503 of FIG. 5. As mentioned above, error detection block 503 tracks the verified data packets, and provides the appropriate NACK response to the sender. As shown in FIG. 9, error detection block 503 receives verified packets from the PHY layer at step 901. As discussed above, these packets may be data packets or FEC parity packets from one or more rounds. Interference in the wireless channel may corrupt the packets and prevents verification. The verified packets are sorted according to their respective multicast groups (step 903) and NACK packets are transmitted at the designated time slots according to the group assignment information received from control channel at step 902. For each multicast group, error detection block 503 determines both the number of non-duplicate FEC parity packets received (step 905), if any, and the number of data packets that have not been properly received (step 906). At step 908, error detection block 503 determines the number of additional packets needed in the next round; based on this information, the appropriate NACK packets are provided to be transmitted at the designated time slots.

Figure 10:
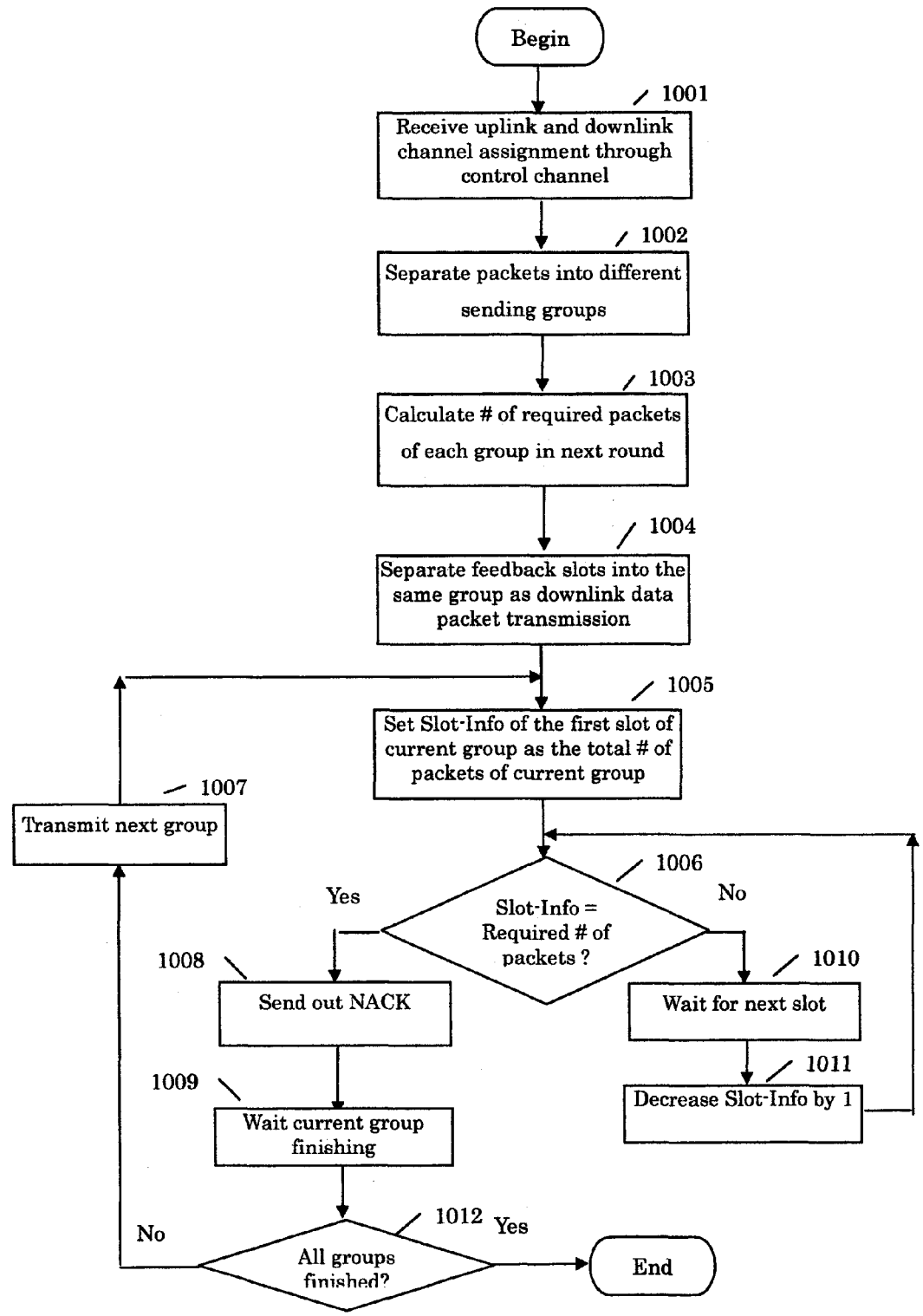
FIG. 10 is a flow chart illustrating the feedback grouping mechanism previously described with respect to FIG. 6.

FIG. 10 is a flow chart for the multicast system illustrating the feedback grouping mechanism previously described with respect to FIG. 6. As shown in FIG. 10, at step 1001, the downlink data channel and uplink data channel assignments and multicast packet group information are received from the dedicated control channel. To allow the acknowledgement packets to uniquely index the loss patterns, the group information from the control channel includes the number of time slots allocated to each multicast packet group. Of course, such information may also be disseminated in a different form, e.g., in packet headers. At step 1002, the received packets are sorted into respective multicast packet groups and, at step 1003, the required FEC parity packets of each multicast packet group in the next round are determined using, for example, the method described above with respect to FIG. 9. As described above, in one embodiment, the acknowledgement time slot assignment in the uplink data channel follows the group allocation in the downlink data channel (step 1004). However, when proactive protection is used, the uplink data channel and downlink data channel time slot assignments may be different. Irrespective of whether proactive protection is used, the number of time slots of each multicast packet group and their allocation in the downlink data channel and the uplink data channel are specified in the manner describe above with respect to step 1001. For each group of acknowledgement time slots corresponding to a multicast packet group, at step 1005, the first time slot indicates that all the packets of the current round are received corrupted, so that the same number of FEC parity packets as the data packets of this round is required in next round. At step 1006, each receiver determines whether the current time slot indicates its FEC parity packet requirements. If so, at step 1008, the receiver sends out a NACK packet. No transmission is made at the other time slots for acknowledging the current multicast packet group. In the present embodiment, as the position of the acknowledgement time slot indicates the number of corrupt packets received (also equal to the number of FEC parity packets required, in one embodiment), a counter may be used to keep track of the time for a NACK packet, e.g. a counter can be decremented until the count in the counter equals the number of corrupt packets received (steps 1010-1011). The current round concludes when the all multicast packet groups have been acknowledged (step 1012).

Figure 11:
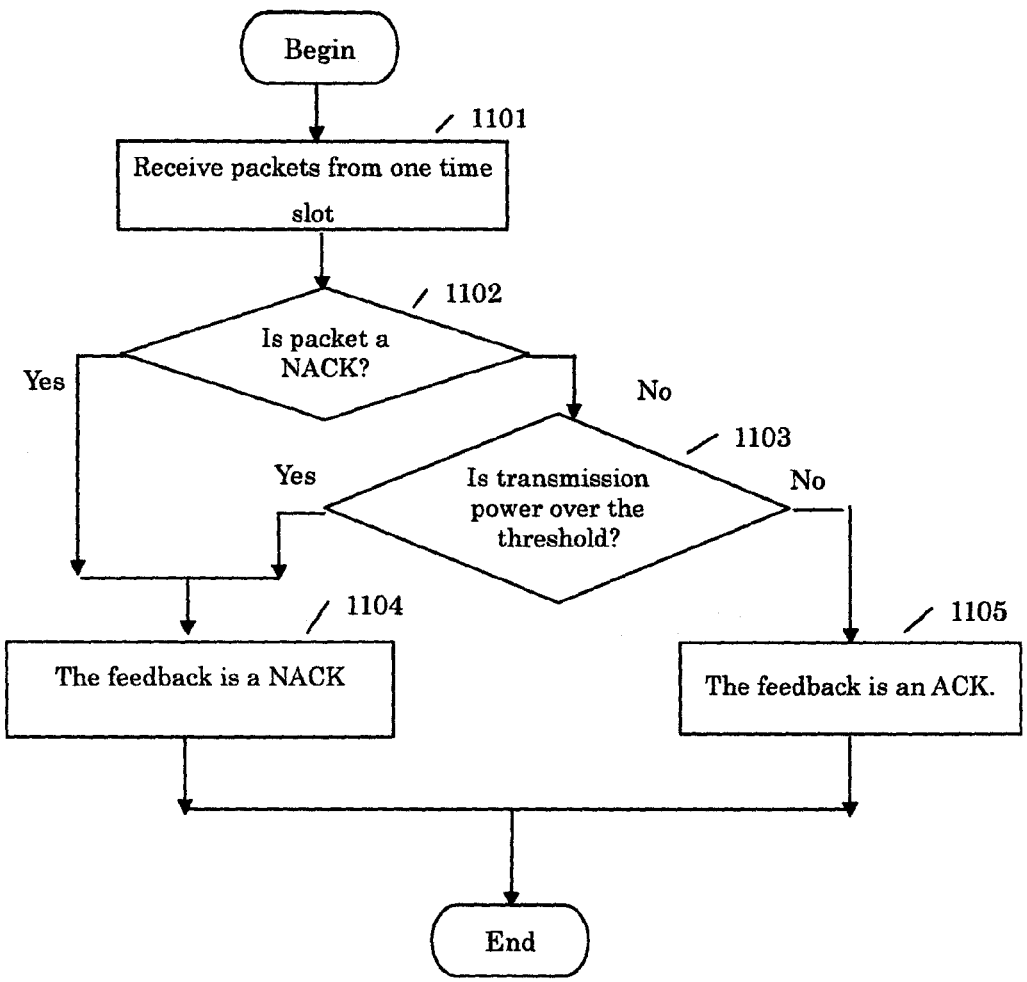
FIG. 11 is a flow chart illustrating the operations of a base station with respect to both receiving a NACK packets and handling a NACK packet collision, in accordance with one embodiment of the present invention.

FIG. 11 is a flow chart illustrating the operations of a base station with respect to both receiving a NACK packets and handling a NACK packet collision, in accordance with one embodiment of the present invention. At step 1101, the base station detects packet transmission of each uplink data channel time slot. At step 1102, the base station determines if the NACK packet received can be verified (i.e., without error). If so, at step 1104, the base station concludes proper receipt of a NACK packet. Otherwise, at step 1103, the base station determines whether the received signal power exceeds a previously determined average noise power threshold. If such a higher received signal power is detected, a NACK packet collision is deemed to have occurred, thus indicating more than one receiver has experienced the number of corrupt data packets indicated by the current time slot. With respect to the base station, the base station treats this signal condition to be the same as having received a NACK packet in the current time slot. However, at step 1103, if the base station detects less signal power than the average noise power threshold, no NACK packet is deemed received (i.e., a quiet channel). The absence of a NACK packet transmission in the current t time slot conveys the same information as a verified ACK packet. Thus, at step 1105, the base station may output to a higher level protocol a result conveying the information of a positive acknowledgement.

Figure 12:
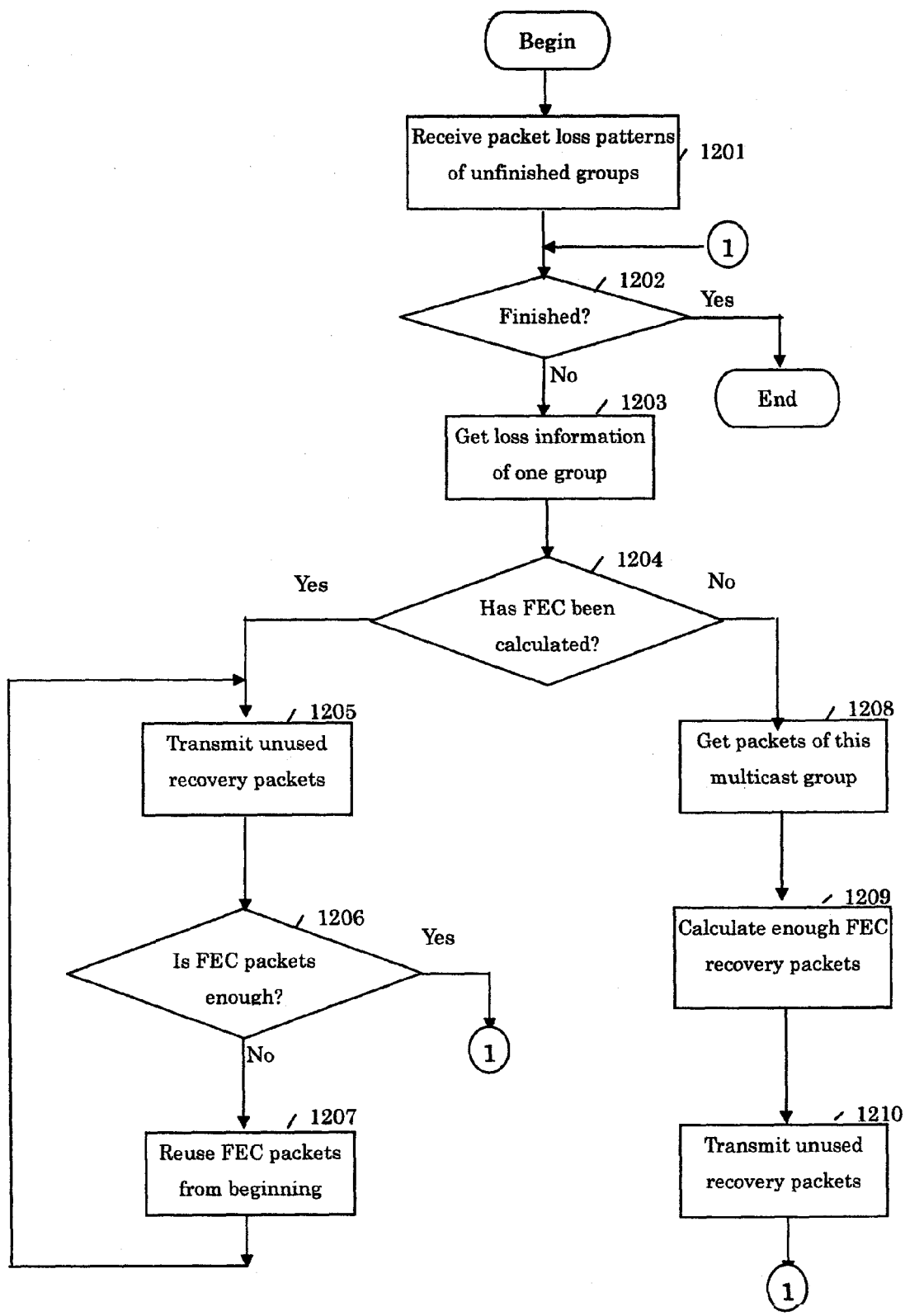
FIG. 12 is a flow chart illustrating the operations of FEC calculation block 405 in the base station, in accordance with one embodiment of the present invention.

FIG. 12 is a flow chart illustrating the operations of FEC calculation block 405 in the base station, in accordance with one embodiment of the present invention. As shown in FIG. 12, at step 1201, FEC calculation block 405 receives a packet recovery requirement from multicast buffer 404. As one or more groups of multicast packets may coexist at the same time, the packet recovery requirement may also involve several multicast groups. At step 1202, FEC calculation block 405 determines if all multicast packet groups have been processed. If so, no FEC calculation is required. Otherwise, at step 1203, FEC calculation block 405 selects a multicast packet group which transmission has not been completed. In one embodiment, the multicast packet groups to be processed are selected in chronological order, beginning with the multicast packet group that began transmission earliest. At step 1204, FEC calculation block 405 checks whether or not the required FEC parity packets of the selected multicast group have been computed. If the required FEC parity packets have not been computed, FEC calculation block 405 gets data packets from multicast buffer 404 at step 1208, to compute the FEC parity packets at step 1209. FEC calculation block 405 may compute more FEC parity packets than are required in the current round, as FEC parity packets are also vulnerable to corruption during transmission. The number of additional FEC parity packets to compute depends on the total number of receivers and the current channel condition, and any algorithm for determining such redundancy may be used within the scope of the present invention. At step 1210, FEC calculation block 405 then transmits the FEC parity packets to the receivers. At steps 1204-1205, if the required FEC parity packets have already been calculated, FEC calculation block 405 provides the existing FEC parity packets to the receivers. Typically, FEC calculation block 405 transmits non-duplicate FEC parity packets (i.e., FEC parity packets that have not been previously transmitted). Otherwise, at step 1206, if the number of non-duplicate FEC parity packets is less than necessary to recover the packet loss, previously transmitted FEC parity packets may be sent at step 1207.

Figure 13:
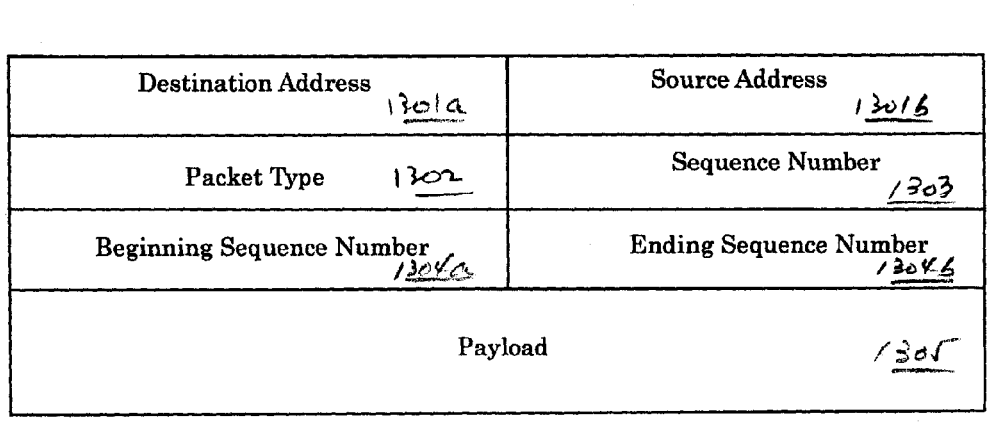
FIG. 13 shows a data format for a MAC layer data packet, in accordance with one embodiment of the present invention.

FIG. 13 shows a data format for MAC layer data packet 1300, in accordance with one embodiment of the present invention. The format shown in FIG. 13 illustrates the present invention in a non-system specific manner; in any real system, additional system-related fields may be included. As shown in FIG. 13, the first two fields of data packet 1300, labeled data fields 1301a and 1301b, are the destination address and source address, respectively. For a downlink data channel transmission, the destination address is the multicast group address and the source address is the MAC address of the base station. For an uplink data channel, the destination address is also the multicast address, but the source address is the MAC address of a receiver. Packet type field 1302 differentiates between a data packet, an FEC parity packet, and a NACK packet. For a data packet type, the "sequence number" field (1303) contains the MAC sequence number of the multicast group. Each multicast group keeps tracks of a consecutive sequence number ranging from 0 to a maximum value. "Beginning Sequence Number" field 1304a and "Ending Sequence Number" field 1304b are not used in for a data packet. Payload field 1305 may contain any number of data words.

In a FEC parity packet, "Sequence Number" field 1303 contains the MAC FEC sequence number of the multicast group. (The MAC FEC sequence number is different from the MAC packet sequence number in a data packet.) The FEC sequence number may also be numbered consecutively from 0 to a maximum value. "Beginning Sequence Number" and "Ending Sequence Number" fields 1304a and 1304b of a FEC parity packet specify the beginning and ending MAC data packet sequence numbers that the FEC parity packet corresponds.

In one embodiment, the sequence number fields 1303, 1304a and 1304b are not used, as the positions of the time slots indicate the number of data packets that are lost.

The above detailed description is provided merely to illustrate the specific embodiments of the present invention and is not intended to be limiting its scope. Numerous variations and modifications within the scope of the invention are possible. For example, grouping the acknowledgement traffic from different receivers can be implemented in ways different from those described above. In particular, if the uplink data channel time slots can be used as binary counters (i.e., the n-th time slot may be used to indicate a $2^{(n-1)}$ packet loss). In such a scheme, the number of uplink data channel time slots can be much less than the number of downlink data channel time slots. For example, every seven downlink data channel time slots require only three uplink data channel time slots. Such a scheme, of course, requires the receivers to be able to monitor each other's transmission, and thus has a limited application. Other encoding of uplink data channel time slots may similarly be provided.

In the above description, by treating a NACK collision as equivalent to receiving a NACK packet, the need for an ACK packet is obviated. To reliably detect a NACK collision, however, the system requires an ability to distinguish between different levels of background signal variation. Alternatively, one may implement both ACK and NACK schemes. To avoid collision of ACK packets, a receiver may be selected, perhaps randomly, as the "leader" of the receivers, which is responsible for providing an ACK packet in each uplink data channel time slot. At the same time, each non-leader receiver transmits only NACK packets, in the manner described above. Under this scheme, if an error occurs, the NACK packet and ACK packet would collide, resulting in a corrupted acknowledgement packet received at the sender. Thus, a properly received ACK packet indicates that the corresponding data packet has been correctly received by all receivers, and a corrupted acknowledgement packet indicates that at least one receiver fails to correctly receive a packet.

The present invention is set forth in the followings claims:

We claim:

1. A media access control (MAC) module in a wireless receiver, the MAC module being interfaced to a physical layer receiver for receiving data packets and to a physical layer transmitter for sending data packets, wherein the data packets received comprise data packets of multicast message, and wherein the data packets sent comprise negative acknowledgement packets, the MAC module comprising:
   a detection module detecting errors in each of the data packets received;
   a multicast buffer for storing the data packets received sorted according to multicast messages; and
   a negative acknowledgement (NACK) packet preparation module for preparing a NACK packet responsive to a received one of the multicast messages, wherein the wireless receiver is configured to transmit the NACK packet in a selected one of a plurality of NACK times slots, the wireless receiver selecting the NACK time slot according to a specified number of errored packets in the received multicast message.

2. A MAC module as in claim 1, further comprising a forward error correction (FEC) module for decoding FEC parity information in the data packets received.

3. A MAC module as in claim 1, further comprising an output queue for passing verified data packets from the error detection module for processing by an upper layer protocol.

4. A MAC module as in claim 1, further comprising a channel multiplexer for sharing the physical layer transmitter amongst data packets and the NACK packets.

5. A MAC module as in claim 1, further comprising a proactive greater than an actual number of data packets errors in the received multicast message.

6. A media access control (MAC) module in a base station, the MAC module being interfaced to a physical layer receiver for receiving data packets and to a physical layer transmitter for sending data packets, wherein the data packets sent comprise data packets of multicast messages, and wherein the data packets received comprise negative acknowledgement (NACK) packets from a plurality of receivers, each receiver transmitting a NACK packet in a selected one of a plurality of NACK time slots according to a specified number of errored packets, the MAC module comprising:
   a detection module detecting a required number of forward error control (FEC) parity packets based upon which NACK time slot a given NACK packet is received in, the NACK time slot identifying the specified number of errors in the given NACK packet; and
   a multicast buffer for storing the data packets to be sent sorted according to multicast messages, wherein the multicast messages include the FEC parity packets.

7. A MAC module as in claim 6, further comprising an output queue for passing verified data packets from the detection module for processing by an upper layer protocol.

8. A MAC module as in claim 6, further comprising a channel assignment module for allocating the physical layer transmitter amongst data packets and the acknowledgement packets.

9. A MAC module as in claim 6, further comprising a proactive protection module for providing a number of FEC parity packets greater than the actual number of data packets failed to be received.

* * * * *